Figure 1:
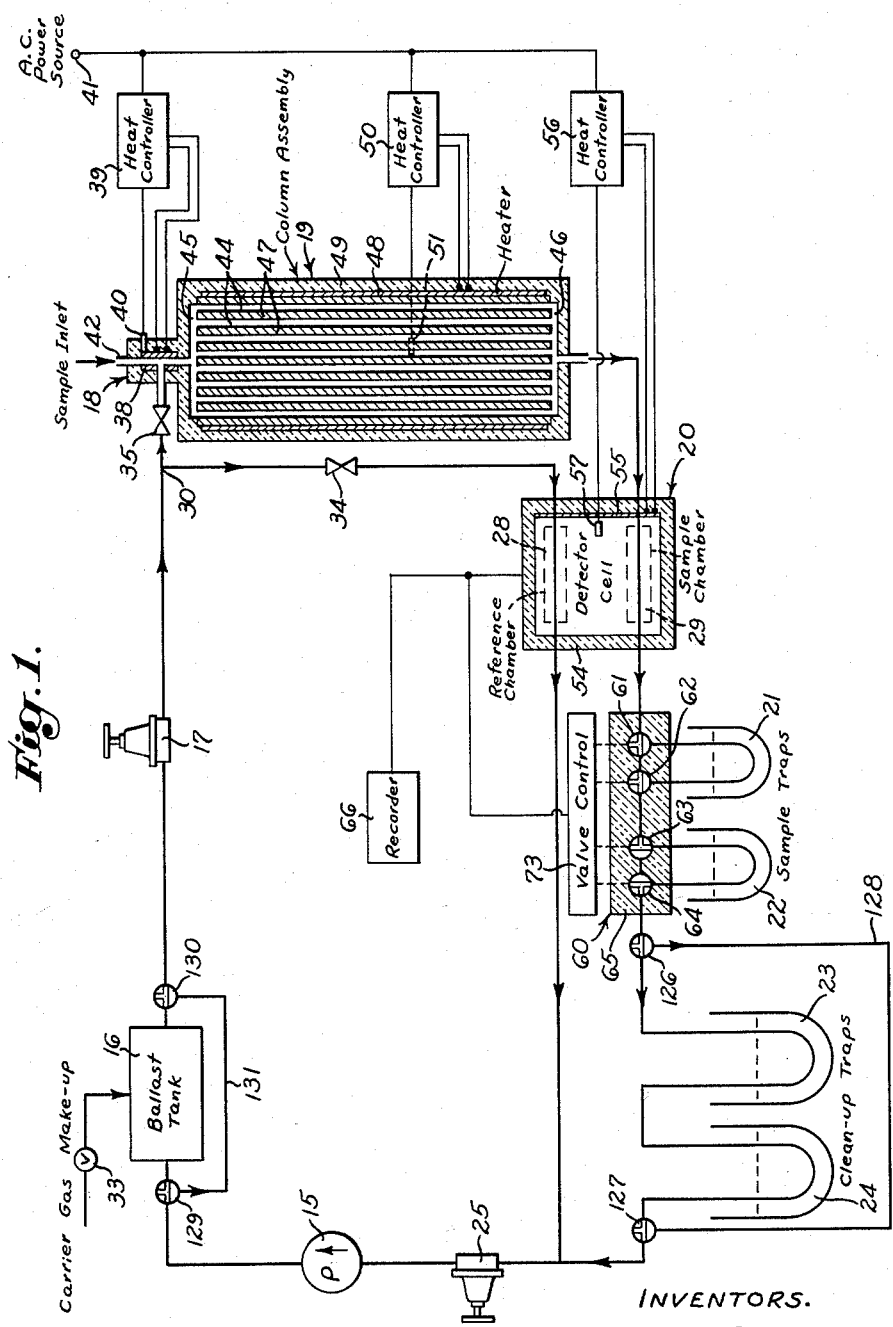

March 23, 1965 D. W. CARLE ETAL 3,174,326
GAS CHROMATOGRAPH
Filed Feb. 24, 1958 4 Sheets-Sheet 2

INVENTORS.
DON W. CARLE
MAURICE R. BURNELL

BY THEIR ATTORNEYS.
HARRIS, KIECH, FOSTER & HARRIS

March 23, 1965 D. W. CARLE ETAL 3,174,326
GAS CHROMATOGRAPH
Filed Feb. 24, 1958 4 Sheets-Sheet 3

INVENTORS.
DON W. CARLE
MAURICE R. BURNELL

BY THEIR ATTORNEYS.
HARRIS, KIECH, FOSTER & HARRIS

March 23, 1965

D. W. CARLE ETAL 3,174,326

GAS CHROMATOGRAPH

Filed Feb. 24, 1958

4 Sheets-Sheet 4

INVENTORS.
DON W. CARLE
MAURICE R. BURNELL

BY THEIR ATTORNEYS.
HARRIS, KIECH, FOSTER & HARRIS

3,174,326
GAS CHROMATOGRAPH
Don W. Carle, Whittier, and Maurice R. Burnell, Yorba Linda, Calif., assignors to Beckman Instruments, Inc., a corporation of California
Filed Feb. 24, 1958, Ser. No. 717,258
8 Claims. (Cl. 73—23.1)

This invention relates to gas chromatography, sometimes referred to as vapor phase partition chromatography, and, in particular, to methods of and apparatus for gas chromatography suitable for preparing separated components for subsequent operations, as well as for sample analysis.

A gas chromatograph is used in determining the identity and proportions of the components of a gaseous or vaporous sample, or of an evaporable fluid mixture. In a typical instrument, a carrier gas is continuously passed through a chamber or column which is packed with a granular material having particular adsorption characteristics or which is coated with a liquid having particular gas or vapor solubility characteristics. A small quantity of the sample is introduced into the carrier at the head of the column at a noted time. If the sample is liquid, provision is made for vaporizing it upon introduction. The various components of the sample are separated within the column and exit at different times, the elapsed time being an indication of the identity of a component. The presence and proportion of the various components in the exit carrier gas are detected by conventional means, such as by a thermal conductivity cell. Such instruments are described in greater detail in the copending applications of Donner and Carle, entitled Temperature Regulator, Serial No. 654,158, filed April 22, 1957, now Patent No. 3,062,037, and Gallaway, entitled Improvement in Gas Chromatography, Serial No. 676,262 now abandoned, filed August 5, 1957.

The conventional gas chromatograph will handle only a very small amount of sample and is suitable for sample analysis only. The actual components of the sample are completely separated and emerge one by one from the chromatograph column providing a precise analysis of the sample. However, the sample components themselves are of too small a quantity to work with conveniently in subsequent operations, such as in infrared analysis, mass spectrometry, etc. Also, it is desirable to obtain the separated components of the sample in amounts large enough for use as actual end products or for further chemical transformation. Accordingly, it is an object of the invention to provide a gas chromatograph which will accommodate samples in the order of twenty to five hundred times greater in mass than the known analytic type chromatograph while maintaining substantially the same degree of resolution. This type of chromatograph will be referred to as a preparative type instrument.

It is an object of the invention to provide a gas chromatograph having a plurality of chromatographic columns operated in parallel. A further object of the invention is to provide such an instrument in which the cross-sectional area of each of the parallel columns is maintained within particular limits to produce a desired resolution while maintaining the prerequisite high capacity. Another object of the invention is to provide such a gas chromatograph having a plurality of columns with the columns being fed through manifolds, which manifolds can be switched to provide various column flow configurations.

It is an object of the invention to provide a gas chromatograph having a totally enclosed flow system for recirculating the carrier gas. Another object of the invention is to provide a flow control for the totally enclosed system including inlet and outlet flow pressure regulators for controlling the pressure within the system, a circulating pump, and a carrier gas ballast tank. A further object of the invention is to provide a series of traps for removing various components from the circulating gas as desired.

It is an object of the invention to provide a gas chromatograph in which the sample is recycled or recirculated through the chromatographic column for several cycles to increase the resolution of the operation. A further object of the invention is to provide means for monitoring the output of the chromatographic column for indicating when given components are emerging from the column and for actuating controls for switching various traps into the flow path.

It is an object of the invention to provide a gas chromatograph having traps for removing sample components and a detector cell in which the zero level of the detector cell is substantially independent of rate of flow of carrier gas. A further object is to provide such an instrument in which the inlets to the sample and reference chambers of the cell are at substantially equal pressures. Another object is to provide for directing a small portion of the column effluent to the sample chamber and a correspondingly small portion of the trap effluent to the reference chamber to achieve the desired equal pressure operation.

It is a further object of the invention to provide a gas chromatograph having a temperature controlled liquid sample vaporizer and a temperature controlled chromatograph column in which the vaporizer is maintained at a temperature a predetermined amount greater than that of the column. Another object of the invention is to provide a temperature control system which supplies heat locally at a high rate to the vaporizer during evaporation of a liquid sample to prevent undue cooling of the vaporizer by the evaporation process, and to accelerate evaporation. A further object of the invention is to provide a vaporization chamber of novel form for handling large liquid samples suitable for a preparative type gas chromatograph.

The invention also comprises novel details of construction and novel combinations and arrangements of parts, which will more fully appear in the course of the following description. The drawings merely show and the description merely describes preferred embodiments of the present invention which are given by way of illustration or example.

Figure 2:
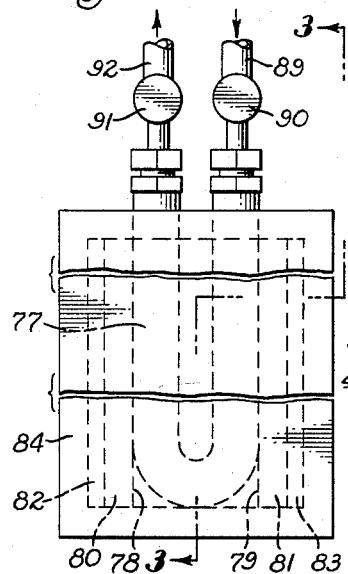
Figure 3:
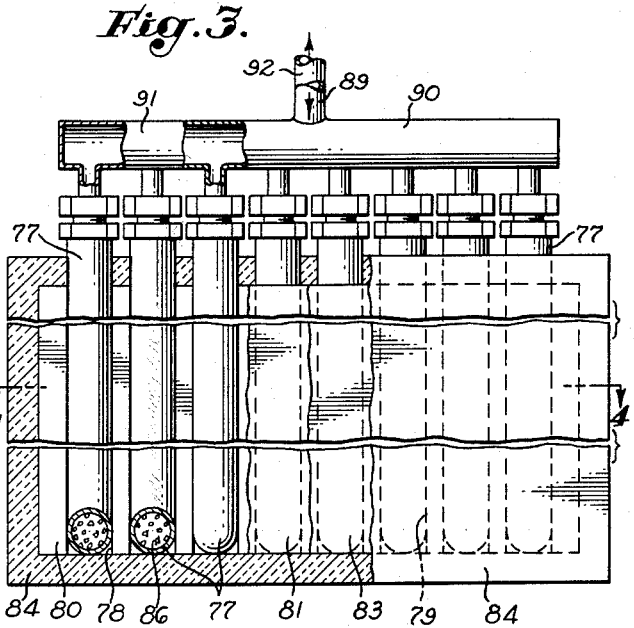
Figure 5:
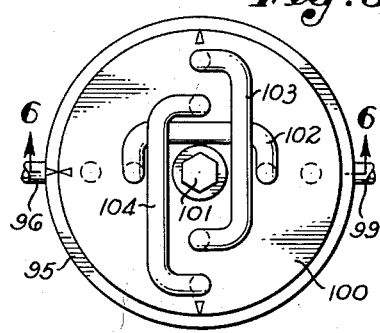
Figure 4:
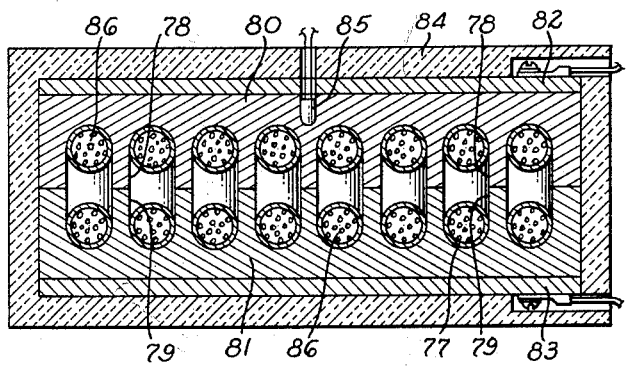
Figure 6:
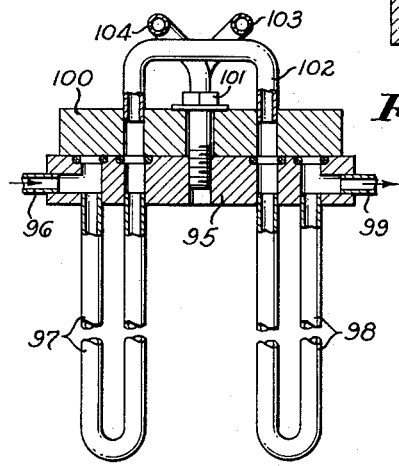
Figure 7:
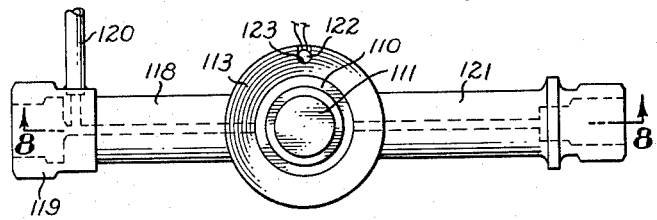
Figure 8:
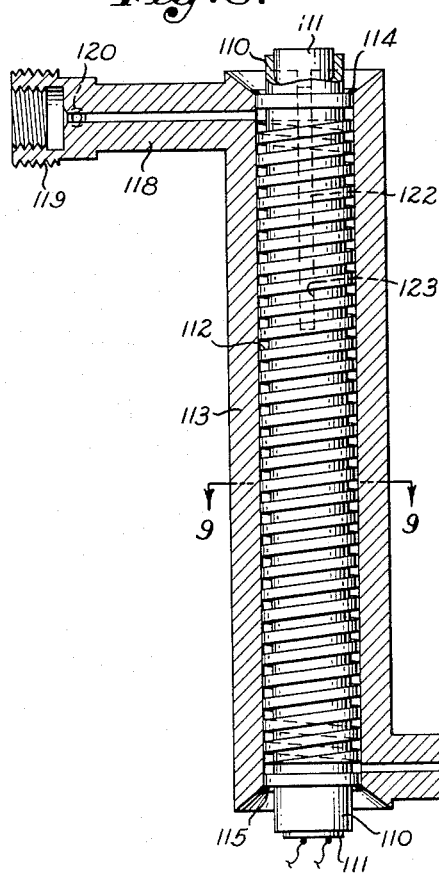
Figure 10:
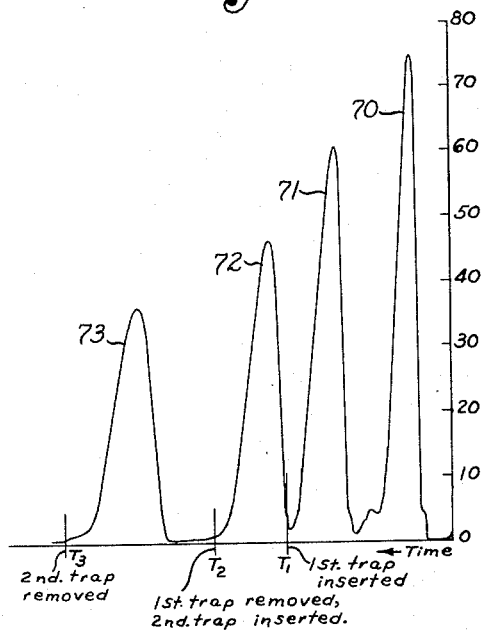
Figure 9:
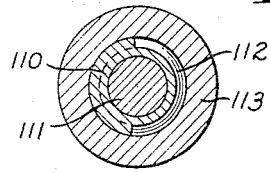
Figure 11:
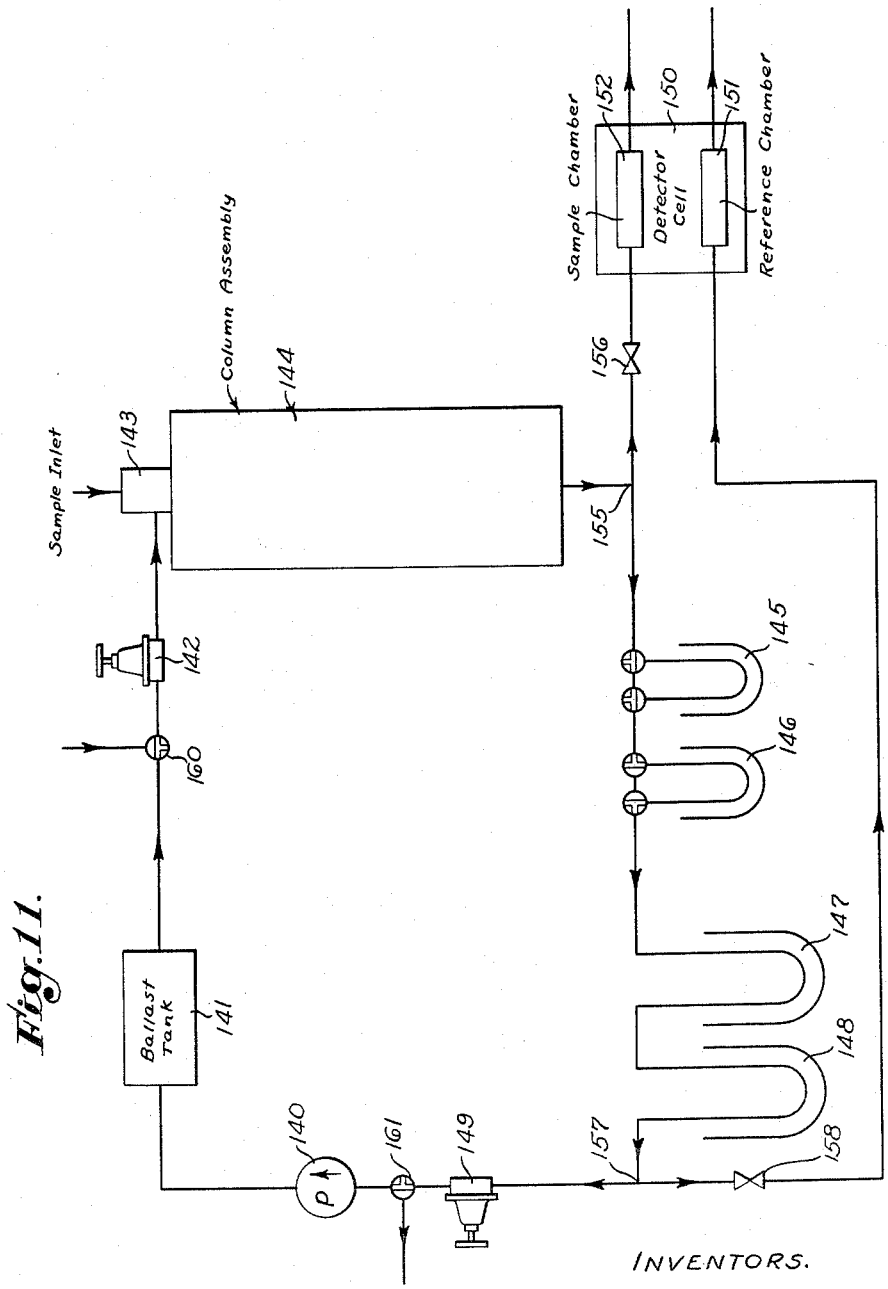

In the drawings:
FIG. 1 is a diagrammatic representation of a preferred embodiment of the gas chromatograph of the invention;
FIG. 2 is an end view of a chromatographic column assembly suitable for use in the embodiment of FIG. 1;
FIG. 3 is a partially sectional view of the structure of FIG. 2 taken along the line 3—3;
FIG. 4 is a sectional view taken along the line 4—4 of FIG. 3;
FIG. 5 is a top view of an alternative form of chromatographic column assembly;
FIG. 6 is a sectional view taken along the line 6—6 of FIG. 5;
FIG. 7 is a top view of a vaporization chamber suitable for use in the embodiment of FIG. 1;
FIG. 8 is a sectional view taken along the line 8—8 of FIG. 7;
FIG. 9 is a sectional view taken along the line 9—9 of FIG. 8;
FIG. 10 is a chart illustrating a mode of operation of the apparatus of the invention; and
FIG. 11 is a diagrammatic representation of an alternative embodiment of the gas chromatograph of the invention.

Referring now to the diagram of FIG. 1, applicants' enclosed system includes a gas pump 15, a ballast tank 16, an inlet pressure regulator 17, a sample vaporization chamber 18, a chromatographic column assembly 19, a detector cell 20, sample traps 21, 22, clean-up traps 23, 24 and an outlet pressure regulator 25, with suitable conduits connecting these elements in series providing a closed circulating flow path.

The detector cell 20 may be a conventional thermal conductivity cell having a reference chamber 28 and a sample chamber 29 with temperature sensitive elements positioned in each chamber. These elements are preferably connected in a bridge circuit so that differences in temperatures of the elements caused by differences in the cooling properties of the sample and reference gas streams passing through the chambers will be reflected in the output of the bridge. When the cooling properties or thermal conductivities of the carrier gas in the reference chamber and a component of the sample gas in the sample chamber are different, an indication will be obtained when such component passes through the detector cell. The time lapse between the introduction of the sample and passage of a component through the detector cell is an indication of the identity of the component and the magnitude of the indicated output of the detector cell is a measure of the relative amount of the component in the sample.

In the embodiment of FIG. 1, a flow divider or T-junction at point 30 in the flow path provides for directing a portion of the carrier gas through the reference chamber 28 while at least a portion of the effluent from the column assembly 19 is directed through the sample chamber 29. Of course, various other methods may be used for obtaining a stream of carrier gas for the reference chamber, such as those shown in the previously identified application of Gallaway, Serial No. 676,262 now abandoned.

The ballast tank 16 is charged with carrier gas through a valve 33 and the pump 15 provides circulation of the carrier gas along the flow path. The inlet pressure regulator 17 provides the desired column head pressure. As a feature of the invention, an outlet pressure regulator 25 is also provided to accurately maintain the desired column back pressure. The difference between the head and back pressures determines the rate of flow through the column assembly. It is preferred to maintain the back pressure at about 0.2 to 4.0 p.s.i. to prevent air from leaking into the system. A preferred form for the outlet pressure regulator is one having a variable orifice for separating a higher pressure inlet zone in the regulator from a lower pressure outlet zone and having a pressure actuated vane or diaphragm responsive to an increase of pressure in the inlet zone beyond a predetermined valve to increase the variable orifice.

A flow restrictor 34 is preferably placed in the line leading to the reference chamber 28, which flow restrictor may have any suitable form, such as a capillary orifice or an elongated tube, and will have a substantially fixed impedance which is reproducible over a long period of time.

A restrictor unit 35 is preferably placed in the line leading to the vaporization chamber 18, which restrictor unit may be a capillary restriction, a check valve, or the like, for preventing back flow into the ballast tank 16 and reference chamber 28 during vaporization of a sample.

The main carrier gas flow is from the inlet pressure regulator 17 to the sample vaporization chamber 18 where sample gases are mixed with the carrier gas and sample liquids are vaporized and mixed with the carrier gas. The chamber is temperature controlled and can provide rapidly a large amount of heat for vaporizing large liquid samples in short periods of time.

The chamber 18 includes a heat source, such as a resistance heater 38 which is energized from a heat controller 39. A temperature sensing element such as a thermistor or resistance bulb 40 is mounted in the chamber to provide a signal for actuating the heat controller. The chamber is maintained at a stand-by temperature which preferably is higher than the operating temperature of the chromatographic column by an amount such that the heat available by cooling of the chamber from the stand-by temperature to the operating temperature of the column is considerably less than the heat of vaporization of the sample. This is achieved by providing a chamber of small mass and therefore low heat storage, but one in which there is available a high rate of heat transfer from a heat source to the chamber. The stand-by temperature may be obtained by operating the heater 38 intermittently at a low average power or by providing a separate heater which is energized continuously. The heat controller 39 may be a conventional amplifier circuit energized from an A.C. power source 41 which circuit in turn energizes the heater when the temperature as sensed by the thermistor falls below a predetermined value.

Then when a sample is introduced into the chamber through a sample inlet 42, initial cooling in the chamber due to the heat of evaporation will cause the heater to be energized, the heat being supplied at an extremely high rate until the sample is completely vaporized. For example, in the instrument described herein, 1500 watts is supplied during vaporization permitting the sample to be vaporized with the speed needed for high resolution. The control system nevertheless prevents overheating before and after sample injection. A preferred form of construction for such a vaporization chamber will be described in detail hereinbelow.

The carrier gas will sweep the vaporized sample from the chamber to the column assembly 19, the chamber being coupled to the column assembly by a thermally insulated conduit or mounted directly on the chamber as shown in FIG. 1.

The column assembly 19 includes a plurality of chromatographic columns 44 which are connected in parallel by an inlet manifold 45 and an outlet manifold 46 permitting simultaneous passage of the carrier gas plus sample through each of the columns. It is usually desirable to operate a chromatographic column at a predetermined operating temperature which is maintained within very close limits, although the predetermined temperature will be changed depending upon the particular sample being treated. In the embodiment of FIG. 1, the columns 44 are positioned in a thermally conductive material such as aluminum 47, in conjunction with a heat source such as a resistance heater 48, with the entire unit being enclosed in a thermally insulating jacket 49. The heater 48 is energized from a heat controller 50 which in turn is actuated by a temperature sensing element such as a thermistor 51 mounted adjacent the columns 44. A suitable column temperature control unit is described in detail in the previously referred to application of Donner and Carle, Serial No. 654,158, now Patent No. 3,062,037. Two alternative embodiments for the chromatographic column assembly will be described in detail hereinbelow.

At least a portion of the effluent from the chromatographic columns is directed through the sample chamber 29 of the detector cell 20 with all of the effluent then passing to the sample traps. The detector cell is preferably enclosed in a thermal insulating jacket 54 and is provided with an electric heater 55 energized by a heat controller 56 which in turn is actuated by a temperature sensing element 57 positioned within the detector cell structure. The conduits for conducting gas to and from the detector cell are also preferably heated so as to maintain the effluent from the column at a sufficiently high temperature to prevent undesired condensation.

After leaving the detector cell, the carrier gas plus sample enters a sample trapping manifold 60 which includes valves 61, 62 for directing the effluent through the sample trap 21 and valves 63, 64 for directing the effluent through the sample trap 22. Of course, any number of sample traps could be included. The manifold is preferably enclosed in a thermal insulating jacket 65 and may include a heat source to maintain the manifold at a temperature sufficient to prevent condensation.

The sample traps may be condensers which condense the vaporized or gaseous sample components and remove them from the carrier gas. Thus, when a particular portion of the effluent from the chromatographic columns is directed through a particular trap, the condensate from this trap will be all of one component. For example, the chart of FIG. 10 illustrates the output of the detector cell as recorded on a recorder 66 when a sample comprising a mixture of methyl, ethyl, isopropyl and n-propyl acetate has been injected into the instrument at the sample inlet. The right-hand peak 70 of the curve indicates that the effluent then passing through the detector cell is substantially carrier gas plus methyl acetate. The second peak 71 indicates that the effluent at this later time is substantially ethyl acetate plus carrier gas. Similarly, the peaks 72 and 73 indicate isopropyl and n-propyl acetate, respectively. If the valves of the manifold 60 are set for straight through flow up until time $T_1$ and then valves 61 and 62 are rotated for passing the effluent through the trap 21 until time $T_2$ and then returned to straight through flow, and valves 63 and 64 are turned to direct the effluent through the trap 22 at time $T_2$ and then return to straight through flow at Time $T_3$, the condensate of the trap 21 will be isopropyl acetate and the condensate of trap 22 will be n-propyl acetate, thereby providing quantities of the desired materials as well as an analysis of the injected sample. The valves of the manifold 60 may be actuated manually in conjunction with visual inspection of the output of the recorder 66 or they may be operated automatically by a valve control 73 which in turn is controlled by the output of the detector cell.

The clean-up traps 23 and 24 serve to remove any portions of the sample not removed by the sample traps. These traps may be of any suitable design, for example, in the embodiment of the instrument illustrated in FIG. 1, the first trap 23 was of the Shepperd Air Pollution type and the second trap 24 of the Cromwell-Schultz type. The first trap removes the easily condensable materials and the second, a high efficiency trap, removes the small quantities of condensable materials which get through the first trap.

The carrier gas from the clean-up traps and from the reference chamber is metered through the regulator 25 and pumped into the ballast tank 16 by the pump 15 thus providing continuous circulation of the carrier gas through the system. The volume of the ballast tank should be at least as great as that of the remainder of the system and preferably several times greater. The large amount of carrier gas stored in the ballast tank provides dilution for any air which is injected into the system along with the samples and also dilution for sample material which is not completely eliminated from the carrier gas by the traps. This dilution prevents spurious peaks from appearing in the output of the detector cell.

One way to increase the output of separated components of a sample from a gas chromatographic column is to increase the cross-sectional area of the column. However, it has been found that when the cross-sectional area is increased beyond a certain limit, a relatively rapid deterioration in the resolution of the instrument sets in. Increasing the length of a column improves the resolution, but at a decreasing rate, thereby placing a practical limit on column length. Typical analytic type instruments use a single column of cylindrical tubing having a cross-sectional area of about 0.025 square inch. It has been determined that substantially the same resolution can be obtained with columns having cross-sectional areas up to about 0.31 square inch, but with larger columns, while capacity continues to increase, resolution begins to drop sharply.

In practicing the invention, it is preferred when maximum resolution must be retained to have the cross-sectional area of each chromatographic column no greater than about 0.31 square inch. However, a column of this increased area still does not provide sufficient sample handling capacity for many purposes. But it has been found that the parallel column structure described herein wherein a number of preferably identical chromatographic columns are operated in parallel will provide the desired sample handling capacity while maintaining the resolution of the single column.

However, maximum resolution is not required in many instances. It has been found that individual columns up to about 1½ inches inside diameter or approximately 2 square inches inside cross-sectional area can give useful resolution in certain applications. Whatever the cross-sectional area of the individual column within this useful range, it is possible according to the invention to multiply the volume handling capacity of the instrument by paralleling of columns while retaining the resolution characterizing the single column.

In one particular instrument constructed in accordance with the teachings of the invention, six columns, each eight feet in length and formed of 0.37 inch inside diameter cylindrical tubing, were operated in parallel. Each column was packed with 40–60 mesh crushed C–22 firebrick (Johns-Manville Co.) treated with Silicone 550 (Dow-Corning). This unit permitted handling of samples which were twenty times greater than the maximum sample useable in the analytic type instrument while providing substantially the same resolution. Helium was used as the carrier gas, the ballast tank being charged with helium in excess of 30 p.s.i. The inlet pressure regulator was set to provide a suitable head pressure up to 30 p.s.i. and the reference chamber restrictor provided a flow of about 200 cc. per minute of carrier gas. Such instrument is capable of being operated at a number of discrete temperature settings between 40° C. and 300° C.

A preferred form of construction for the chromatographic column assembly is shown in FIGS. 2, 3, and 4. Eight U-shaped tubes 77 are positioned in mating grooves 78, 79 in blocks 80, 81, respectively. The blocks 80, 81 are made of a good thermal conducting material, such as aluminum, and heater elements 82, 83 are mounted on the exterior of the blocks. The entire unit is enclosed in a thermally insulating jacket 84. A thermistor 85 is fixed in a groove in the block 80 serving as a temperature sensing element.

In this particular embodiment, each of the tubes 77 is a six foot length of five eighths inch inside diameter stainless steel tubing packed with the chromatographic column material 86 previously described.

A manifold structure carried at the ends of the tubes permits the tubes to be connected in various series-parallel combinations. This may be a variable manifold structure such as will be shown in connection with FIGS. 5 and 6 or a relatively fixed structure as shown in FIGS. 2, 3, and 4. An inlet conduit 89 connects with an inlet manifold 90 which in turn connects with one end of each of the tubes 77. The other end of each of the tubes is connected with an outlet manifold 91 which in turn connects with an outlet conduit 92, thus providing for a parallel, simultaneous flow of the gas through each of the tubes.

Samples of 15 cc. volume or ninety times the maximum useable with conventional analytical instruments, were handled with the column assembly of FIGS. 2, 3, and 4, the resolution again being substantially the same.

In the embodiment of FIGS. 5 and 6, a fixed manifold 95 has an inlet conduit 96, chromatographic columns 97, 98 and an outlet conduit 99 mounted thereon with the inlet conduit connecting with the inlet end of the column 97 and the outlet conduit connecting with the outlet end of the column 98.

Another manifold 100 is mounted on the manifold 95 by a bolt 101 permitting relative rotation of the two manifolds. The manifold 100 has a plurality of openings therethrough, with pipe 102 interconnecting two of the openings, pipe 103 interconnecting another pair of the openings, and pipe 104 interconnecting still another pair of the openings. When the upper manifold 100 is in the position shown in FIGS. 5 and 6, the pipe 102 will connect the outlet end of the column 97 to the inlet end of the column 98, thereby connecting the two columns in series. When the upper manifold is rotated 90° from the position shown in FIGS. 5 and 6, one of the pipes 103, 104 will interconnect the inlet ends of the two columns and the other of these pipes will interconnect the outlet ends of the two columns, thereby placing the columns in parallel.

A preferred form of construction for the vaporization chamber is shown in FIGS. 7, 8 and 9. A metallic sleeve 110 is snugly fitted over a cartridge type electric heating element 111, the sleeve having a spiral groove 112 in the outer surface thereof. This groove may be formed by turning a thread on the sleeve with the ends of the sleeve preferably being cut down to the root diameter of the thread. A second sleeve 113 is fitted around the first sleeve 110, the junction of the sleeves at each end thereof being sealed by suitable means such as by welding as indicated at 114, 115, to provide a totally enclosed spiral passage about the heating element 111.

A tube 118 carried at the upper end of the sleeve 113 has a threaded fitting 119 at its outer end for coupling the incoming carrier gas to the vaporization chamber. A tube 120 carried on the tube 118 provides for introduction of the sample into the flowing stream of carrier gas. Another tube 121 carried at the other end of the sleeve 113 serves as an outlet for conducting the carrier gas plus vaporized sample to the chromatographic column assembly. A thermistor 122 is mounted in a groove 123 in the outer surface of the sleeve 113 to serve as a temperature sensing element for the controller of the heating element.

This sample vaporizing chamber, while having relatively small mass, provides for rapid and complete vaporization of large samples by providing for rapid transfer of heat from a high heat source, which heat source is energized only when necessary to maintain the chamber at the desired temperature.

The resolution of the instrument of the invention can be improved by recycling of the sample through the chromatographic column. In such a mode of operation, the sample is not removed from the carrier gas after passing through the chromatographic column but rather is recirculated around the closed flow path so as to pass through the column several times. Then when the desired resolution is obtained, the sample may be removed in the usual manner by use of the traps. Referring to the diagram of FIG. 1, valves 126 and 127 may be used to direct the carrier gas plus sample through a bypass line 128 around the clean-up traps. Valves 129 and 130 may be used to direct the carrier gas plus sample through bypass line 131 around the ballast tank 16, thus preventing dilution of the sample by the large quantity of the carrier gas in the ballast tank. In operating the instrument in the recycling mode, the sample can be recycled for a predetermined number of times or the output of the detector cell can be continuously monitored to determine when the desired resolution has been achieved.

FIG. 11 illustrates an alternative embodiment of the invention in which the detector cell is connected into the flow system in a different manner. The instrument includes a gas pump 140, a ballast tank 141, an inlet pressure regulator 142, a sample vaporization chamber 143, a chromatographic column assembly 144, sample traps 145, 146, clean-up traps 147, 148, and an outlet pressure regulator 149, with suitable conduits connecting these elements in series providing a closed circulating flow path. The instrument also includes a detector cell 150 having a reference chamber 151 and a sample chamber 152. Each of these components may be the same as the corresponding component in the embodiment of FIG. 1.

The sample chamber 152 is connected to the effluent from the column assembly 144 at a junction 155 through a flow restrictor 156. The reference chamber 151 is similarly coupled to the effluent from the traps at a junction 157 through a flow restrictor 158. Each of the flow restrictors serves to reduce the flow therethrough to a desirable, relatively low value so that only a small portion of the total gas flow in the system passes through the detector cell. The sample and reference chambers are ordinarily exhausted to the atmosphere. The pressures at points 155 and 157 are substantially equal since the pressure drop in the traps is negligible. Also, these pressures are substantially constant with respect to atmospheric pressure due to the action of the outlet pressure regulator 149. The flow restrictors 156 and 158 preferably are identical so that the pressures at the sample and reference chambers are substantially equal.

In the flow system of FIG. 11, the detector zero level is substantially independent of the rate of flow through the column assembly, thus permitting the flow rate to be varied over a wide range without requiring circuit readjustment. This is an important feature of the invention, permitting the flow rate to be changed during a run to speed up the elution of heavy components which would emerge only very slowly if the rate of flow was maintained the same as that desired for the elution of the lighter components of the same sample.

If desired, the detector cell flow system of FIG. 11 can be used without recirculating the carrier gas by introducing the carrier gas at valve 160 ahead of the inlet pressure regulator 142 and venting the carrier gas at valve 161 following the outlet pressure regulator 149.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. In a gas chromatograph for separating components of a sample, the combination of: an inlet conduit; an outlet conduit; a plurality of chromatographic columns, each having an inlet and an outlet; first manifold means for coupling said inlet conduit to each of said column inlets in parallel; second manifold means for coupling each of said column outlets to said outlet conduit in parallel; means for introducing carrier gas into said inlet conduit for simultaneous flow through said parallel connected chromatographic columns; means for introducing a sample into said inlet conduit; conduit means defining a gas flow path from said outlet conduit to said inlet conduit; a gas pump coupled in said flow path for continuously circulating said carrier gas along said flow path; and condenser means coupled in said flow path for condensing a selected component of the sample gas passing therethrough removing such selected components from the recirculating carrier gas, said conduit means including a column inlet pressure regulator positioned between said pump and said inlet conduit, a column output pressure regulator positioned between said condenser and said pump, and a ballast tank positioned between said pump and said inlet pressure regulator, said tank defining a chamber having a volume greater than the volume of the remainder of the gas chromatograph.

2. In a gas chromatograph for separating components of a sample, the combination of: chromatographic column means having an inlet and an outlet and adapted to be traversed by a carrier gas; means for introducing a sample into said inlet; conduit means defining a circulatory flow path from said outlet to said inlet; a gas pump coupled in said flow path for continuously returning carrier gas from said outlet to said inlet; condenser means for condensing a selected fraction of a gas passed therethrough; means for coupling said condenser means into said flow path; a gas detector cell having reference and sample chambers; means for conducting at least a portion of the effluent of said column means to said sample chamber; a flow divider positioned in said flow path between said pump and said column inlet for conducting a portion of the effluent of said pump to said reference chamber; a first flow restricting element positioned between said flow divider and said column inlet; and a second flow restricting element positioned between said flow divider and said reference chamber, said conduit means including a column inlet pressure regulator positioned between said pump and said flow divider, a column outlet pressure regulator positioned between said condenser means and said pump, and a ballast tank positioned between said pump and said inlet pressure regulator, said tank defining a chamber having a volume greater than the volume of the remainder of the gas chromatograph.

3. In a gas chromatograph for separating components of a relatively large sample, the combination of: a plurality of chromatographic columns of substantially identical size and composition, each of said columns being capable of producing high resolution of the components of a relatively small sample; a source of a stream of carrier gas; an input manifold for directing said stream into the inlet of said columns in parallel; an output manifold for receiving said stream from the outlet of each of said columns; an outlet pressure regulator coupled to the outlet of said outlet manifold; means coupled between said outlet manifold and said outlet pressure regulator for removing sample components from said stream; an inlet pressure regulator coupled to the inlet of said input manifold, with said regulators adjusted to maintain a constant pressure across said parallel connected columns and with the outlet pressure of said columns above that of the surrounding atmosphere; means for introducing a relatively large sample into said stream between said inlet pressure regulator and said input manifold; a conduit defining a gas flow path from said outlet pressure regulator to said inlet pressure regulator; a gas pump coupled in said flow path for continuously circulating said carrier gas along said flow path; and means coupled in said conduit between said pump and said inlet presure regulator for diluting the effluent from said pump with carrier gas.

4. In a gas chromatograph, the combination of: a sample vaporization chamber; means for introducing a sample to be analysed into said chamber; a chromatographic column assembly comprising a plurality of tubular column elements each having an inlet end and an outlet end; a first manifold member with the inlet and outlet ends of each of said tubular elements terminating in said first manifold member; an inlet conduit carried in said manifold member providing a flow passage to at least one of said inlet ends; an outlet conduit carried in said first manifold member providing a flow passage from at least one of said outlet ends; a second manifold member mating with said first manifold member, said second manifold member providing passage means for selectively bridging selected ones of said ends; means for maintaining said first and second manifold members in mating relationship, said manifold members being relatively movable to first and second operating positions, with said tubular elements connected in a first flow configuration in said first position and connected in a second flow configuration in said second position; a condenser for removing condensible materials from a gas mixture flowing therethrough; and means for flowing a carrier gas through said chamber, said inlet conduit, said column elements, said outlet conduit and said condenser.

5. In a gas chromatograph for separating components of a sample, the combination of: chromatographic column means having an inlet and an outlet and adapted to be traversed by a carrier gas; means for introducing a sample into said inlets; conduit means defining a circulatory flow path from said outlet to said inlet; a gas pump coupled in siad flow path for continuously returning carrier gas from said outlet to said inlet; condenser means coupled in said flow path between said outlet and said pump; a gas detector cell having reference and sample chambers; means for conducting a portion of the effluent of said column means to said sample chamber; means for conducting a portion of the effluent of said condenser means to said reference chamber; and first and second flow restricting elements positioned ahead of said sample and reference chambers respectively for controlling flow therethrough, said conduit means including a column inlet pressure regulator positioned between said pump and said sample introduction means, a column outlet pressure regulator positioned between said condenser means and said pump, and means positioned between said pump and said column inlet pressure regulator for diluting the effluent from said pump with additional carrier gas.

6. A method of gas chromatography comprising: injecting a sample mixture into a chromatographic column; eluting said sample mixture from said column by means of a carrier gas traversing said column; removing from the effluent of said column substantially all sample components present in said effluent; diluting the remaining sample components in said carrier gas with additional sample-free carrier gas at an elevated pressure; and recirculating the resultant relatively sample component free carrier gas through said column.

7. In a gas chromatograph for separating components of a sample, the combination of: chromatographic column means having an inlet and an outlet and adapted to be traversed by a carrier gas; means for introducing a sample into said inlet; conduit means defining a circulatory flow path from said outlet to said inlet; a gas pump coupled in said flow path for continuously returning carrier gas from said outlet to said inlet and recirculating said carrier gas through the same column means; trap means for removing selected components of a sample from a gas passed therethrough; means for coupling said trap means into said flow path between said outlet and said gas pump to remove said selected sample components from the gas passing therethrough; and a ballast tank coupled in said flow path between said gas pump and said inlet, said ballast tank containing a large volume of carrier gas for diluting any sample components remaining in said recirculated carrier gas.

8. In a gas chromatograph for separating components of a sample, the combination of: chromatographic column means having an inlet and an outlet; means for injecting carrier gas and a sample mixture into said inlet; means external of said column means for bridging said inlet and outlet and defining a circulatory flow path therewith, said bridging means including pumping means for continuously returning the effluent of said column means from said outlet to said inlet for recirculation through the same column means, trap means coupled between said outlet and said pumping means for removing selected components of a sample from said effluent and means coupled between said pumping means and said inlet for diluting the effluent being returned by said pumping means with pure carrier gas; and detector means responsive to the effluent of said column means for monitoring the distribution of components of the sample in said effluent.

References Cited in the file of this patent

UNITED STATES PATENTS

| | | |
|---|---|---|
| 1,671,677 | Keeton | May 29, 1928 |
| 2,252,541 | Arnold | Aug. 12, 1941 |
| 2,759,560 | Miller | Aug. 21, 1956 |
| 2,891,630 | Hall et al. | June 23, 1959 |

OTHER REFERENCES

Book: Vapor Phase Chromatography, Desty Butterworths Scientific Publications, London 1956, articles: Whitham, pp. 195–208; Whitham, pp. 395–409; Green, pp. 388–392; Drew et al., pp. 213–220.

Book: Gas Chromatography, by Phillips Academic Press, New York, 1956, pp. 28, 29.

Article by Ambrose et al., published in Nature, vol. 177, January 1956, page 84.

Article by Simmons et al., published in Analytical-Chemistry, vol. 30, No. 1, January 1958, pages 32–35.